(12) United States Patent
Predko

(10) Patent No.: US 6,263,450 B1
(45) Date of Patent: Jul. 17, 2001

(54) PROGRAMMABLE AND RESETTABLE MULTIFUNCTION PROCESSOR TIMER

(75) Inventor: Myke Predko, North York (CA)

(73) Assignee: Celestica North America Inc., Toronto (CA)

( * ) Notice: Subject to any disclaimer, the term of this patent is extended or adjusted under 35 U.S.C. 154(b) by 0 days.

(21) Appl. No.: 09/192,379

(22) Filed: Nov. 16, 1998

(30) Foreign Application Priority Data

Oct. 9, 1998 (CA) .................................................. 2249927

(51) Int. Cl.⁷ ...................................................... G06F 1/04
(52) U.S. Cl. ............................... 713/502; 713/500; 377/52
(58) Field of Search .................................. 713/502, 500, 713/501; 377/47, 52, 110

(56) References Cited

U.S. PATENT DOCUMENTS

| | | | |
|---|---|---|---|
| 3,891,973 | 6/1975 | Maxwell | 340/172.3 |
| 4,099,232 | 7/1978 | Mensch, Jr. | 364/200 |
| 4,161,787 * | 7/1979 | Groves et al. | 364/900 |
| 4,220,990 | 9/1980 | Alles | 364/200 |
| 4,680,621 * | 7/1987 | Baker et al. | 358/19 |
| 4,739,277 * | 4/1988 | Hollister et al. | 328/55 |
| 5,437,021 | 7/1995 | David et al. | 395/550 |
| 5,572,720 * | 11/1996 | Reed et al. | 395/555 |
| 5,748,949 * | 5/1998 | Johnston | 395/557 |

* cited by examiner

*Primary Examiner*—Thomas Lee
*Assistant Examiner*—Thuan Du
(74) *Attorney, Agent, or Firm*—Blake, Cassels & Graydon LLP

(57) ABSTRACT

The programmable timer for use in a microprocessor has a counter and a reset register each connected to a databus of the microprocessor, and a first comparator for comparing the counter against the reset register in providing the result of the comparison at a first comparison output. The counter includes a clock signal input for counting clock pulses. The counter may be reset to a reset value via a reset input provided on the counter. The reset register may receive and store a digital value from the microprocessor. The first comparison output is connected to the reset input in order to reset the counter when the counter reaches a count greater than or equal to the value stored in the reset register thereby providing a periodic signal at the first comparison output. The programmable timer may operate in various modes including, an interval timing mode, a PWM encode mode and a pulse timing mode.

11 Claims, 2 Drawing Sheets

PROGRAMMABLE AND RESETTABLE MULTIFUNCTION PROCESSOR TIMER

FIELD OF THE INVENTION

The invention relates generally to timers and more particularly to a multifunction microprocessor timer for timing intervals and producing and timing pulse width modulated digital signals.

BACKGROUND OF THE INVENTION

It is common in many microprocessor applications which require the performance of specific tasks at certain times to use processor timers to time such events. The generation of a square wave signal which is used for pulse width modulation ("PWM") DC motor control is one example of where the timer is used. Processor timers are also used as interval or "watchdog" timers to keep track of the time elapsed since the occurrence of a certain event. After a predetermined time period has elapsed the watchdog timer notifies the processor so that appropriate action may be taken. A processor timer may also be used to generate periodic interrupts. This sort of timer function is useful in real time applications such as data sampling and communications.

Microprocessor timers of the prior art which have been used to produce repeated interrupts are typically counters which provide an interrupt when the counter overflows, or in the case of a countdown timer, when the counter reaches zero. In these types of timers, a countdown counter is typically loaded with a start value by the processor. The clock signal to the counter causes the counter to count down from its start value to zero. The larger the start value loaded into the counter, the longer the countdown period. When the counter counts down to zero, a zero comparator interrupts the processor. In order to begin timing the next interrupt the counter must be reloaded with a new start value. This requires the processor to execute a series of instructions in order to reload the counter and restart the timer, thereby adding an inherent delay to the timing interval and reducing the accuracy of the timer. The inherent delay cannot be factored into the countdown period because the delays are unpredictable due to variations in processor speed caused by congestion from the execution of other applications.

Microprocessor timers also often employ a "prescaler" in order to lengthen the timing period. The prescaler is usually a divide-by counter which increments the counter only after a given number of input clock ticks. Reading the prescaler could be a useful way of determining the number of cycles elapsed since the timer was finished so that the subsequent timing period may be adjusted accordingly. However, in the usual implementation of a clock and prescaler, the prescaler is cleared any time the timer is written to, so this useful information is lost.

Because of the above deficiencies, special dedicated timer hardware is often designed for specific applications so that the application does not have to rely on the inaccurate microprocessor timer. This need for special dedicated hardware can add to the cost and complexity of an application.

Timers are used in applications where it is desired to create or time pulse width modulated signals. PWM signals are used in communications, dc motor control and other applications. In dc motor control the duty cycle of the PWM signal controls the torque or speed of the motor. A timer can be used to generate a PWM signal having a specified duty cycle. A timer may also be used to measure the width of incoming PWM pulses. Timers of the prior art that have been used for PWM applications have exhibited the same deficiencies as are seen in interval timers of the prior art.

As can be seen from the above, a microprocessor timer capable of generating accurately timed interrupts, generating accurate PWM signals and accurately measuring PWM signals without the need for special dedicated application hardware is desirable.

SUMMARY OF THE INVENTION

According to a first broad aspect, the invention provides a programmable timer for use with a microprocessor, the timer having a counter connected to a databus of the microprocessor, the counter including a clock signal input for counting clock pulses and reset means for resetting the contents of the counter to a reset value. The timer also has a reset register connected to the microprocessor databus for receiving and storing a digital value from the microprocessor. The timer also has a first comparator for comparing the counter against the reset register and providing the result of the comparison at a first comparison output, the first comparison output being connected to the reset means in order to reset the counter when it reaches a count greater than or equal to the value stored in the reset register to thereby provide a periodic signal at the first comparison output.

The first comparison signal may be connected to an interrupt input of the microprocessor to thereby periodically interrupt the microprocessor with a period corresponding to the value stored in the reset register.

The programmable timer may also have a PWM register connected to the microprocessor databus for storing digital value corresponding to a duty cycle of a pulse width modulated signal, and a second comparator for comparing the PWM register and the counter and providing the results of the comparison at a second comparison output, thereby providing a pulse width modulated signal at a second comparison output having a period corresponding to the value stored in the reset register and a duty cycle corresponding to the valued stored in the PWM register.

The programmable timer may also have an AND gate with one input connected to a PWM signal source and one input connected to a clock source, and a multiplexer controllable by said microprocessor, the multiplexer having a first data channel connected to an output of the AND gate and a second data channel connected to the clock source, wherein the counter is operative to count the number of clock pulses corresponding to phase of the PWM signal source when the first multiplexer data channel is selected.

BRIEF DESCRIPTION OF THE DRAWINGS

For a better understanding of the present invention and to show more clearly how it may be carried into effect, reference will now be made, by way of example, to the accompanying drawings which show a preferred embodiment of the present invention and in which.

DESCRIPTION OF A PREFERRED EMBODIMENT

Figure 1:
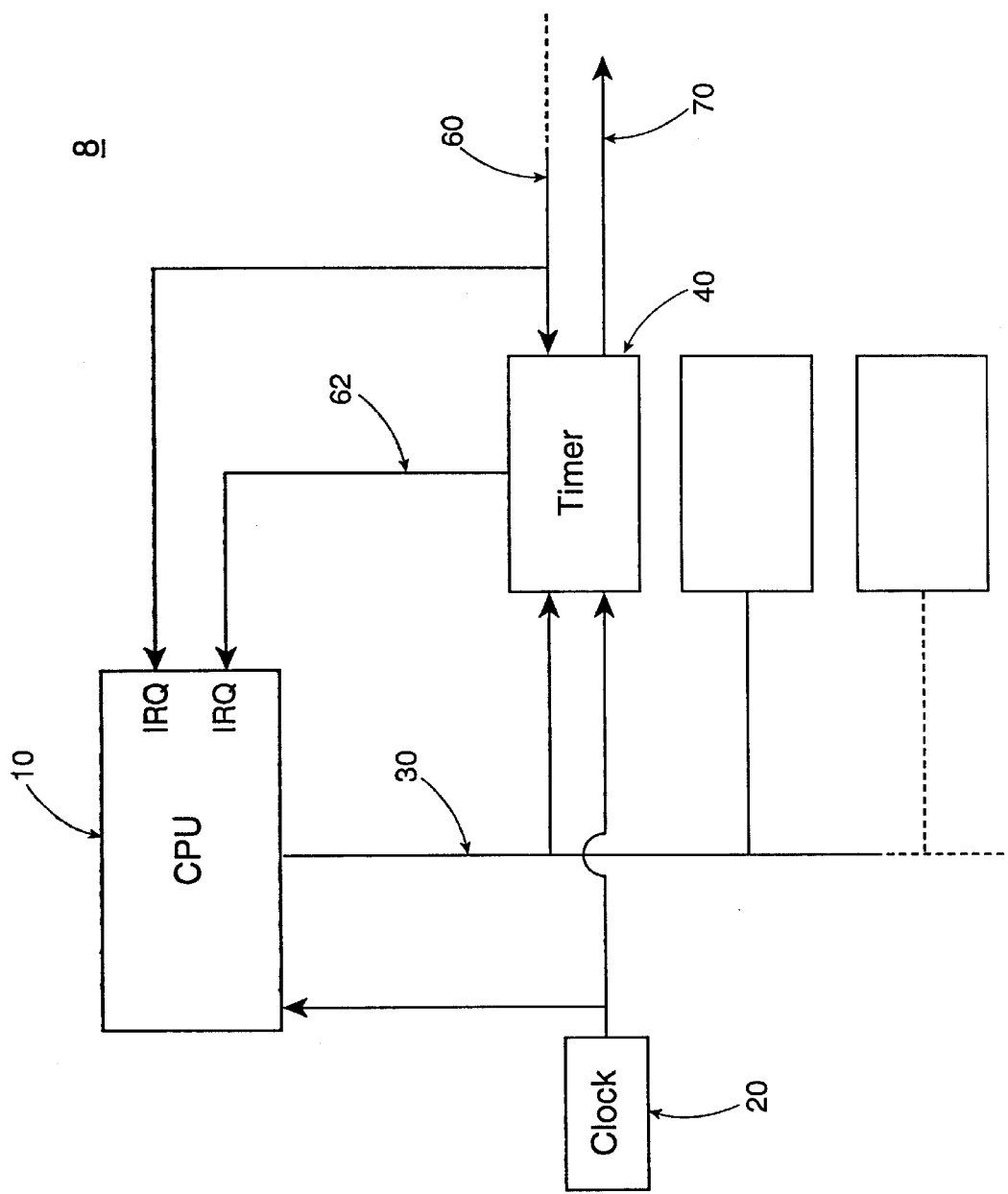
FIG. 1 is a block diagram of a microprocessor incorporating a multifunction processor timer to a preferred embodiment of the invention.

FIG. 1 is a block diagram of a microprocessor 8 incorporating a multifunction processor timer 40 according to a preferred embodiment of the invention. The timer 40 is connected to a CPU 10 via a bus 30 such that data may be exchanged between the CPU 10 and the timer 40. The bus 30 connects the CPU 10 to various on-chip and peripheral devices such as a random access memory, a read only memory, peripheral interface adaptors for connecting the CPU 10 to devices such as keyboards, monitors or the like. The function of the CPU 10 and various possible on-chip and peripheral devices connected to the bus 30 are well known by those skilled in the art and their function is not immediately relevant to the present invention and will therefore not be explained here.

Both the CPU 10 and the timer 40 are coupled to a clock 20 which provides an operating signal to the microprocessor 8. Alternatively, separate clock signals could be provisioned for each of the CPU 10 and the timer 40. Separate clocks may be desirable where the timer 40 is used for timing very long periods of time for which a fast processor clock is unsuitable. In such a case the timer 40 could be configured so that it could select either the processor clock or the separate timer clock to give the timer the flexibility of timing very short or very long periods.

The timer 40 also includes an input line 60 and a PWM output line 70. The input line 60 carries a pulse width modulated ("PWM") signal for measurement by the timer 40. The timer 40 may also be used to provide PWM signals which are produced on the PWM output line 70.

Figure 2:
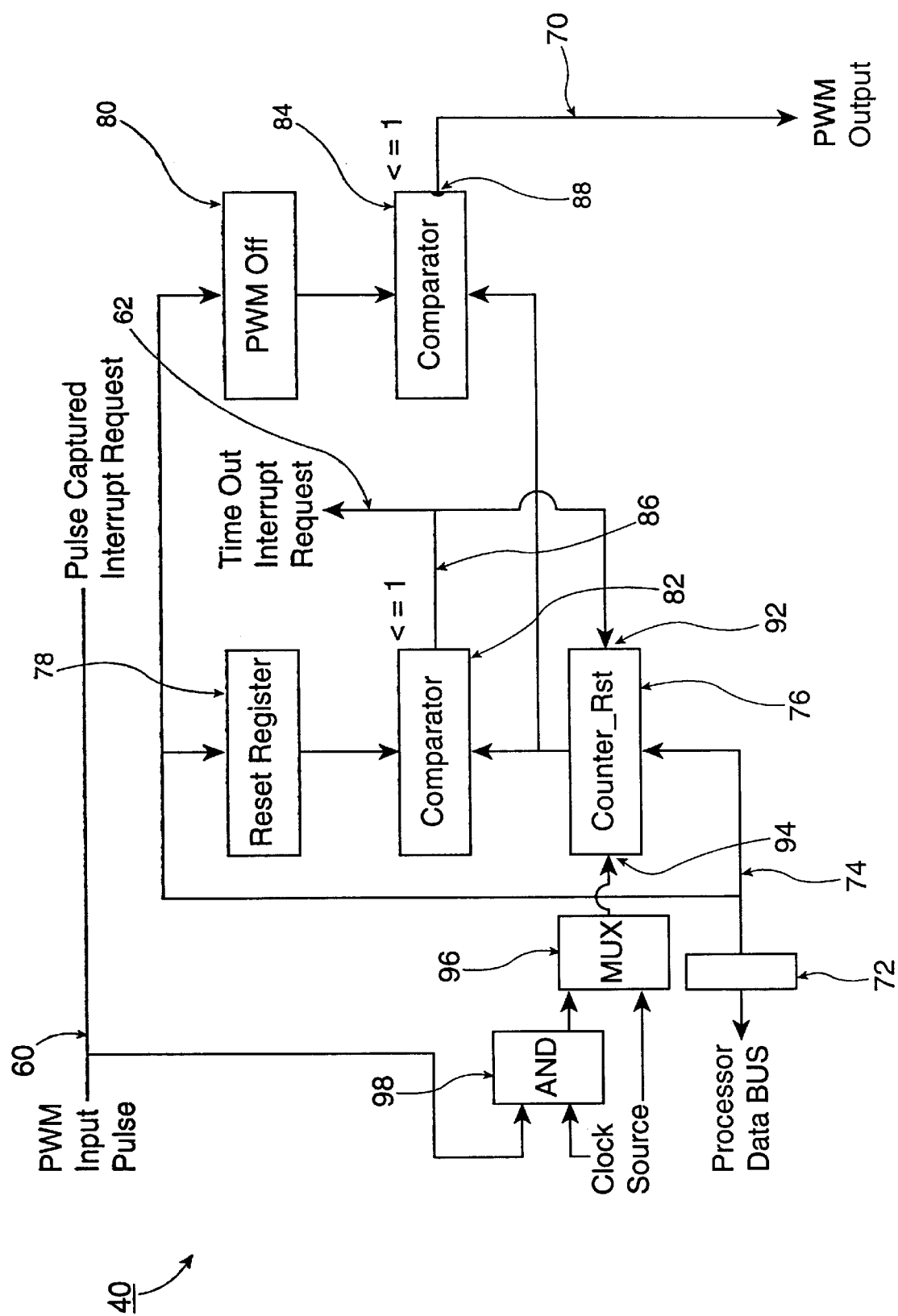
FIG. 2 is a detailed block diagram of the multifunction processor timer of FIG. 1.

Referring additionally to FIG. 2, the details of the timer 40 are shown in greater detail. The timer 40 comprises a databus interface 72 which connects the timer 40 to the bus 30. The databus interface 72 is connected to an internal databus 74, and permits the CPU 10 to write to and read from the timer 40. The timer 40 also includes a counter 76, a reset register 78, a PWM-OFF register 80 and first and second comparators 82, 84. The counter 76, reset register 78 and PWM off register 80 are each connected to the internal databus 74 such that the CPU 10 may write to and read from each of the counter 76, reset register 78 and PWM-OFF register 80. The addressing mechanisms that enable the CPU 10 to read from and write to these registers are not shown in the figures but are well known to those skilled in the art.

The first comparator 82 is coupled to both the reset register 78 and the counter 76 and has a single-bit first comparator output 86. In the preferred embodiment of the invention, the CPU 10 has a 16-bit data output and the bus 30, databus interface 72 and internal databus 74 are each 16-bits wide. Each of the counter 76, reset register 78 and PWM-OFF register 80 are also 16-bits. The use of 16-bit components is not essential to the operation of the timer 40 but eliminates the eed for a prescaler to increase the timing range of the timer as is typically necessary in timers using 8-bit components.

The first comparator 82 comprises logic circuitry for comparing the 16-bit value in the reset register 78 to the 16-bit value in the counter 76. When the value in the counter 76 is greater than the value in the reset register 78, the first comparator output 86 is set low. For all other values in the counter 76 the first comparator output 86 is set high. Alternatively, the timer 40 may be configured such that the first comparator output 86 is set low when the value in the counter 76 is greater than or equal to the value in the reset register 78.

The second comparator 84 has a single bit second comparator output 88 which is connected to the PWM output line 70. The second comparator 84 is connected to the PWM-OFF register 80 and the counter 76. The second comparator 84 is functionally identical to comparator 82 except that it compares the values of the PWM-OFF register 80 to the counter 76. Thus, when the value in the counter 76 is greater than the value in the PWM-OFF register 80 the second comparator output 88 is set low, otherwise the second comparator output 88 is set high. The first and second comparators 82, 84 may have various designs for performing their compare functions, which designs are familiar to those skilled in the art.

The counter 76 includes a reset input 92 which is coupled to the first comparator output 86. The counter 76 also has a clock input 94. When the first comparator output 86 is high the counter 76 is in counting mode and responds to the clock signal received at the clock input 94 by incrementing on each clock pulse. When the first comparator output 86 goes low, i.e. when the value of the counter 76 is greater than the value of the reset register 78, the counter 76 is reset to a reset value via the reset input 92. In the preferred embodiment, the reset value of the counter 76 is zero.

The timer 40 is equipped with a multiplexer 96 and an AND gate 98 which are used for controlling the clock signal received at the clock input 94 of the counter 76, depending on the mode in which the timer 40 is operating. The clock input 94 is connected to the output of the multiplexer 96, the inputs of which are the clock signal generated by the clock 20 and the output of the AND gate 98. The inputs of the AND gate 98 are the input line 60 and the clock signal from the clock 20. The multiplexer 96 can be switched so that either the straight clock signal from the clock 20 or the output of the AND gate 98 is received at the clock input 94. The output of the multiplexer 96 is determined by a control register (not shown) in the timer 40 that the CPU 10 can read from and write to. Since the multiplexer 96 has only two possible states, only one bit in the control register would be required. The control of multiplexers using control registers is familiar to those skilled in the art.

In the preferred embodiment, the timer 40 may operate in one of three different modes. In the first mode, the timer 40 is simply used as a device to generate repeated interrupt requests occurring at accurate intervals. This mode is referred to as the "interval timing mode". In a second mode, the timer 40 can be used to generate a PWM signal on the PWM output line 70. This mode is referred to as the "PWM encode mode". In a third mode, the timer 40 can be used as a timer for timing the duration of an input pulse which is received on the input line 60. This mode is referred to as the "pulse timing mode".

When the timer 40 is operating in either the interval timing mode or PWM encode mode, the multiplexer 96 is switched so that the straight clock signal from the clock 20 is received at the clock input 94. When the timer 40 is in the pulse timing mode for timing the duration of input pulses, the multiplexer 96 is switched so that the output of the AND gate 98 is received at the clock input 94. Therefore, when the timer 40 is in the pulse timing mode, the clock input 94 will only receive a clock signal while the input line 60 is transmitting a pulse.

The function of the timer 40 in each of the three modes of operation will now be described in detail. When operating in interval timing mode, the timer 40 is used to generate repeated interrupt request signals on the IRQ line 62. The repeated interrupts may be used by the processor to perform such functions as data sampling which is required to be performed at accurate timed intervals. The interrupt may also be used by devices other than the CPU 10 such as a DRAM unit to indicate when DRAM cells should be refreshed.

In interval timing mode, the reset register 78 is loaded with a value corresponding to the length of the desired interval between interrupts (measured in clock pulses). As discussed above, when the timer 40 is in interval timing mode the multiplexer 96 is set to directly provide the clock signal from the clock 20 at the clock input 94. The counter 76 is incremented from its initial "reset" or "zero" state by each clock pulse at the clock input 94. When the counter 76 is incremented to a value greater than the value in the reset register 78, the first comparator 82 changes the logic state of the first comparator output 86 from "high", or 1, to "low", or 0. The first comparator output 86 is connected to the IRQ line 62 and an interrupt signal is provided to the CPU 10 or other appropriate device.

The first comparator output 86 is also connected to the reset input 92 of the counter 76 so that, when the first comparator output 86 goes low the counter 76 is reset. After the counter 76 is reset the value of the counter 76 is no longer greater than the reset register 78 and therefore the first comparator output 82 returns to high. A clock pulse is still being received at the clock input 94, and the counter 76 begins to increment on the next clock pulse and time the interval for the next interrupt. Thus, an interrupt is generated and the counter 76 is reset to time the next interval without any intervention from the CPU 10. The timer 40 will repeat these steps indefinitely until the CPU 10 intervenes to stop the interval timing or switch the mode of operation of the timer 40. In order to lengthen or shorten the timed interval, the reset register 78 is simply loaded with a higher or lower number by the CPU 10 via the internal databus 74.

It is not necessary to reload the counter 76 after each interrupt since it is automatically reset by the first comparator output 86. The CPU 10 does not need to read or write to the timer 40 while the timer 40 is in interval timing mode, unless the timing interval is to be changed or an intermediate reading of the counter 76 is desired. Because no intervention is required from the CPU 10, there are no delays in resetting the timer 40 to begin timing subsequent intervals. As a result, the time required for resetting the counter 76 is consistent and predictable from the timing diagrams of the first comparator 82 and counter 76. This provides for a more accurate interval timer and frees up processing time in the CPU 10.

In the PWM encode mode, the timer 40 is used to produce a PWM signal on the PWM output line 70. The PWM signal may be used to control the speed of certain types of DC motors.

In PWM DC motor control, the speed or power of the motor is determined by the integrated value of a digital PWM signal. PWM DC Motor control is often used to control DC motors when the DC supply voltage cannot be varied. The PWM signal is used to switch the DC power supply on and off in order to regulate the power of the DC motor. The duty cycle of the PWM signal may be set between 0% and 100%. When the PWM signal is a square wave with equal high and low time, the power supply is on only half of the time and the motor operates at 50% power. Thus the PWM signal may be varied to regulate the power (or speed-torque output) of the motor.

In PWM encode mode, the reset register 78 is loaded with a value corresponding to the length of the PWM signal period. The PWM Off register 80 is loaded with a value corresponding to the desired duty cycle for the PWM signal. For example, if a PWM signal with a cycle time of 1710 clock cycles and a duty cycle of 50% is desired, then the reset register 78 would be loaded with the 16-bit binary value for 1710, which is 0000011010101110 and the PWM Off register 80 would be loaded with the 16-bit binary value 0000001101010111 which is equal to half of 1710, or 855.

The counter 76 is repeatedly incremented by the clock pulses at the clock input 94. While the value of the counter 76 is less than or equal to the value in the PWM Off register 80 the second comparator 84 produces a high, or 1, output at the second comparator output 88. When the counter is incremented to a value which is greater than the value in the PWM Off register 80, the second comparator output is changed to a low or 0. The counter 76 continues to be incremented until the counter 76 reaches a value greater than the value in the reset register 78, at which point the first comparator output 86 also goes low and the counter 76 is reset. When the counter 76 is reset, the value in the counter 76 is again less than both the reset register 78 and the PWM Off register 80 and the first and second comparator outputs 86, 88 return to high. As mentioned above, the second comparator output is connected to the PWM output line 70. The second comparator output 88 produces a PWM signal on the PWM output line 70 having a duty cycle equal to the ratio of the value in the PWM Off register 80 to the value in the reset register 78. The PWM signal is high while the counter 76 is less than both the PWM Off register 80 and the reset register 78, and low whenever the counter 76 is greater than either the reset register 78 or PWM Off register 80.

In the pulse timing mode, the timer 40 is used to time incoming pulses on the input line 60, i.e., decode a PWM signal and convert it into a series of 16-bit binary values. Extra hardware comprising of the AND gate 98 and the multiplexer 96 are required for the timer 40 to operate in pulse timing mode. As discussed above, in pulse timing mode the multiplexer 96 is set so that the output of the AND gate 98 is received at the clock input 94 of the counter 76.

As a result, in the pulse timing mode, the clock signal is only received at the clock input 94 while the signal on the input line 60 is high. When the input signal on input line 60 goes low, no clock pulses are received at the clock input 94, the counter 76 stops counting and the content of the counter 76 reflects the width of the most recent input pulse (on the input line 60) measured in clock pulses. As can be seen in FIG. 1, the input line 60 is also connected to the CPU 10 so that a pulse captured interrupt request is produced when the signal on the input line 60 goes low to indicate to the CPU 10 that a pulse has been measured. An associated interrupt routine causes the CPU 10 to read the contents of the counter 76 thus obtaining a measurement of the length of the last received pulse. After the counter 76 has been read and the data used or stored in memory, the interrupt routine then causes the CPU 10 to reset the timer 40 by writing a zero value to the counter 76. When the next incoming pulse is detected on the input line 60 by the AND gate 98, the clock signal is again provided at the clock input 94 and the counter 76 begins timing the next pulse.

Alternatively, additional hardware may be provided that will cause the counter 76 to be reset when the leading edge of the next incoming pulse on the input line 60 is detected. Such additional hardware would further reduce the instruction overhead that is required to administer the pulse timing mode of the timer 40 relieving the CPU 10 of the job of resetting the counter 76 after each pulse. In addition with such hardware in place, it would not be necessary for the CPU 10 to be interrupted after each pulse. Instead, the CPU 10 could simply periodically poll the incoming pulses by reading the contents of the counter 76 at times when the signal on the input line 60 is low. Thus, the CPU 10 would not have to read the counter 76 after each incoming pulse on the input line 60. However, in order to be accurate, the CPU 10 would have to be restricted to reading the counter 76 when the input line 60 is low in order to insure that it was not reading a pulse length before the timer 40 had finished timing the pulse.

The above description assumes that the counter 76 is a count-up timer with a reset state of zero. It will be appreciated by those skilled in the art that the counter 76 may alternatively be a count-down or count-up timer and that the counter may have any reset state. In addition, the outputs of the first and second comparators 82, 84 may alternatively have inverted logic states to those described above without affecting the performance of the timer 40. It is also possible to vary the components of the timer 40 so they may handle larger or smaller data. For example, the timer 40 could be designed to handle 32-bit or 8-bit values instead of the 16-bit values described above without altering the general inventive concept of the timer 40. Minor and obvious modifications to the design of the timer 40 would need to be implemented in order to accommodate these variations.

Those skilled in this art will appreciate that the present invention has been described herein by way of example only, and that various modifications of detail may be made to the invention, all of which come within its spirit and scope.

What is claimed is:

1. A programmable timer for use with a microprocessor, said programmable timer comprising:
   a counter connected to a databus of said microprocessor, said counter including a clock signal input for counting clock pulses and reset means for resetting the contents of the counter to a reset value;
   a reset register, connected to said microprocesor databus, for receiving and storing a digital value from said microprocessor; and
   a first comparator for comparing said counter against said reset register and providing the result of the comparison at a first comparison output, said first comparison output being connected to said reset means in order to reset said counter when it reaches a count greater than or equal to the value stored in said reset register to thereby provide a periodic signal at said first comparison output.

2. A programmable timer according to claim 1, wherein said first comparison signal is connected to an interrupt input of said microprocessor to thereby periodically interrupt said microprocessor with a period corresponding to the value stored in said reset register.

3. A programmable timer according to claim 1, further comprising:
   a PWM register, connected to said microprocessor databus, for storing a digital value corresponding to a duty cycle of a pulse width modulated signal; and
   a second comparator for comparing said PWM register and said counter and providing the result of the comparison at a second comparison output, thereby providing a pulse-width modulated signal at said second comparison output having a period corresponding to the value stored in said reset register and a duty cycle corresponding to the value stored in said PWM register.

4. A programmable timer according to claim 2, further comprising:
   an AND gate having a first input connected to a PWM signal source and a second input connected to a clock source generating said clock pulses; and
   a multiplexer having a first data channel connected to an output of said AND gate and a second data channel connected to said clock source, wherein said counter is operative to count the number of clock pulses corresponding to a phase of said PWM signal source when said first multiplexer data channel is selected.

5. A programmable timer for use with a microprocessor system, said microprocessor system comprising a microprocessor, a clock module generating clock pulses and a bus providing communications between said microprocessor and said clock module, said programmable timer comprising:
   a counter connected to said bus, said counter comprising a clock signal input receiving said clock pulses, a counter output and a reset input to selectively reset said counter output to a reset counter value;
   a reset register connected to said bus, said reset register comprising a reset register output value; and
   a first comparator connected to said bus, said first comparator providing a first comparison of a counter output value at said counter output with said reset output value and generating a first comparator output signal from a result of said first comparison, said first output signal representing a first clocking signal for said timer, said first output signal provided to said reset input when said counter output value is greater than or equal to said reset output value,
wherein said first clocking signal is a periodic signal.

6. A programmable timer for use with a microprocessor system as claimed in claim 5, said programmable timer further comprising:
   a PWM register connected to said bus, said PWM register storing a PWM value corresponding to a duty cycle of a PWM signal and providing a PWM output of said PWM value; and
   a second comparator connected to said bus, said second comparator providing a second comparison of said PWM value with said counter output value, said second comparison representing a second timing signal for said timer, said second comparator generating a second comparator output signal resulting from said second comparison,
wherein said second timing signal comprises a pulse width modulated signal having a period corresponding to said reset value and a duty cycle corresponding to said PWM value.

7. A programmable timer according to claim 6, further comprising:
   an AND gate having one input connected to a PWM signal source and one input connected to said clocking pulses; and
   a multiplexer having a first data channel connected to an output of said AND gate and a second data channel connected to said clocking pulses.

8. A programmable timer according to claim 7, wherein said microprocessor provides control signals to said multiplexer and said first clocking signal is provided as an interrupt signal to said microprocessor.

9. A programmable timer according to claim 8 wherein said timer operates in an interval timing mode, said interval timing mode comprising setting said reset register with an interval value corresponding to an interval time spanned by a consecutive number of said clock pulses.

10. A programmable timer according to claim 8 wherein said timer operates in a PWM encode mode, said PWM encode mode comprising setting said reset register with a PWM signal frequency value and setting said PWM register value with a duty cycle value.

11. A programmable timer according to claim 8 wherein said timer operates in a pulse timing mode, said pulse timing mode comprising selecting said first multiplexer input and having said counter count a number of said clock pulses corresponding to a phase of said PWM signal source.

* * * * *